United States Patent [19]
Mojden et al.

[11] Patent Number: 5,395,208
[45] Date of Patent: Mar. 7, 1995

[54] ROTARY ARTICLE STORAGE AND OUTFEED APPARATUS

[75] Inventors: Daniel R. Mojden, Clarendon Hills; Thomas E. Close, Jr., Shorewood, both of Ill.

[73] Assignee: Fleetwood Systems, Inc., Countryside, Ill.

[21] Appl. No.: 158,911

[22] Filed: Nov. 29, 1993

[51] Int. Cl.6 ............................................. B65G 61/00
[52] U.S. Cl. .................................... 414/795.8; 221/11
[58] Field of Search ................. 414/795.8; 221/11, 17, 221/119, 120, 121, 122

[56] References Cited

U.S. PATENT DOCUMENTS

| | | | |
|---|---|---|---|
| 2,906,072 | 9/1959 | Carlson | 221/11 |
| 3,669,308 | 6/1972 | Werner et al. | 221/119 |
| 3,722,741 | 3/1973 | Mojden | 221/11 |
| 4,000,709 | 1/1977 | Mojden | 113/114 |
| 4,024,963 | 5/1977 | Hautau | 414/795.8 |
| 4,195,961 | 4/1980 | Waiblinger | 414/795.8 |
| 4,558,802 | 12/1985 | Molison | 221/11 |
| 4,592,462 | 6/1986 | Mojden et al. | 198/464.2 |
| 4,907,941 | 3/1990 | Focke et al. | 414/795.8 |
| 5,096,371 | 3/1992 | Mojden et al. | 414/795.8 |
| 5,154,315 | 10/1992 | Dominico et al. | 221/11 |

Primary Examiner—Michael S. Huppert
Assistant Examiner—Thomas J. Brahan
Attorney, Agent, or Firm—Trexler, Bushnell, Giangiorgi & Blackstone, Ltd.

[57] ABSTRACT

A rotary article storage and outfeed apparatus stores a plurality of groups of generally flat articles in a facewise stacked condition and delivers a supply of these articles to an infeed for a device wherein the articles are to be utilized. The apparatus comprises an upper rotary carousel rotatable about an upper axis and a lower rotary carousel located below the upper carousel and rotatable about a lower axis parallel to and offset from the upper axis. Each of the carousels has a plurality of circumferentially spaced vertically oriented pockets, each pocket being dimensioned for receiving a group of articles in a facewise stacked condition. A frame mounts the upper and lower carousels so that an upper end of the pockets of the lower carousel is spaced below a lower end of the pockets of the upper carousel, and so that the lower and upper axes are offset in such a way that one of the pockets of the lower carousel coaxially aligns with one of the pockets of the upper carousel at one position in the respective rotations thereof to define an article transfer position. An article transfer device is provided for transferring a group of articles between the pockets of the respective carousels which are aligned and located in the transfer position.

16 Claims, 5 Drawing Sheets

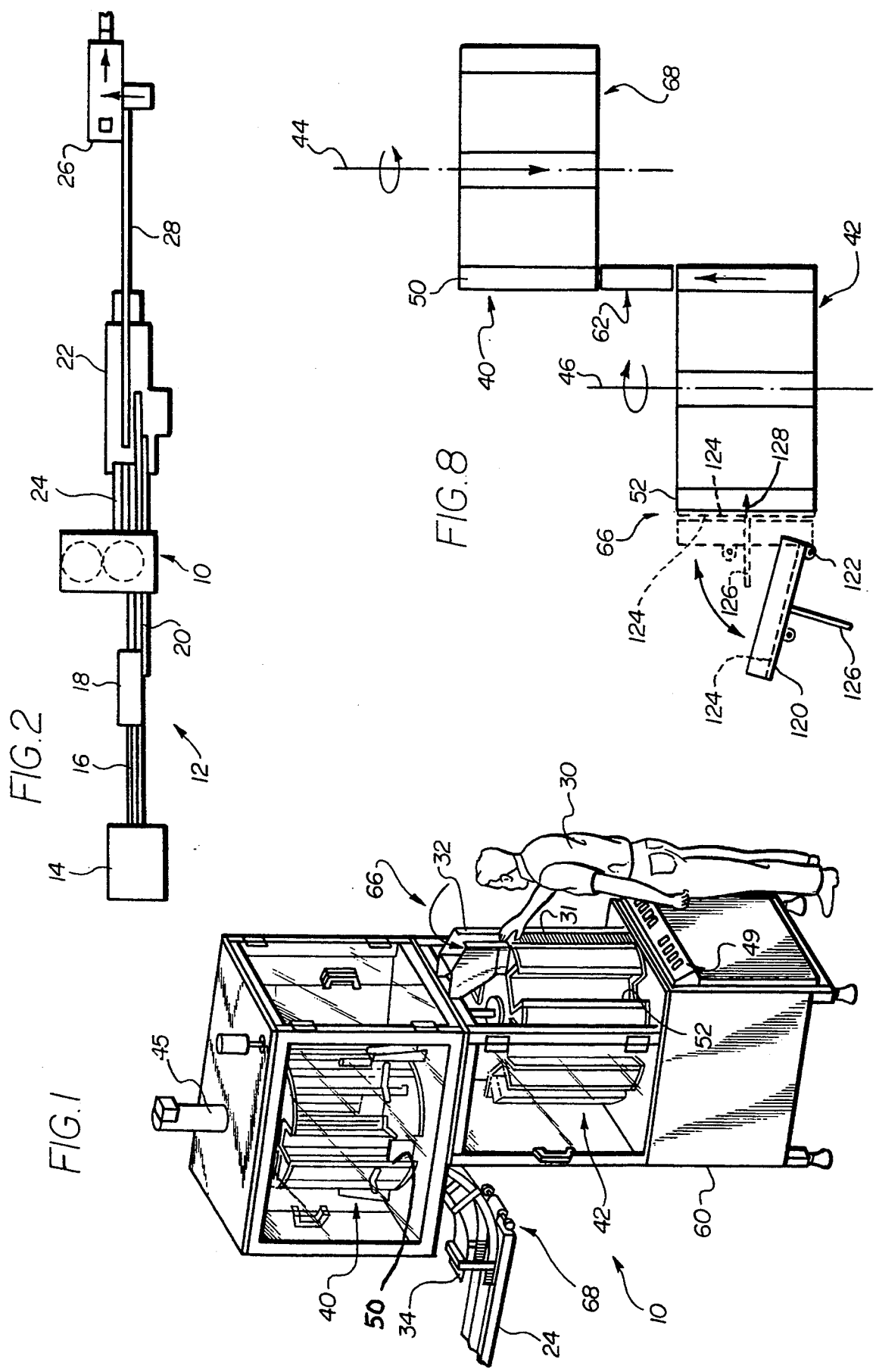

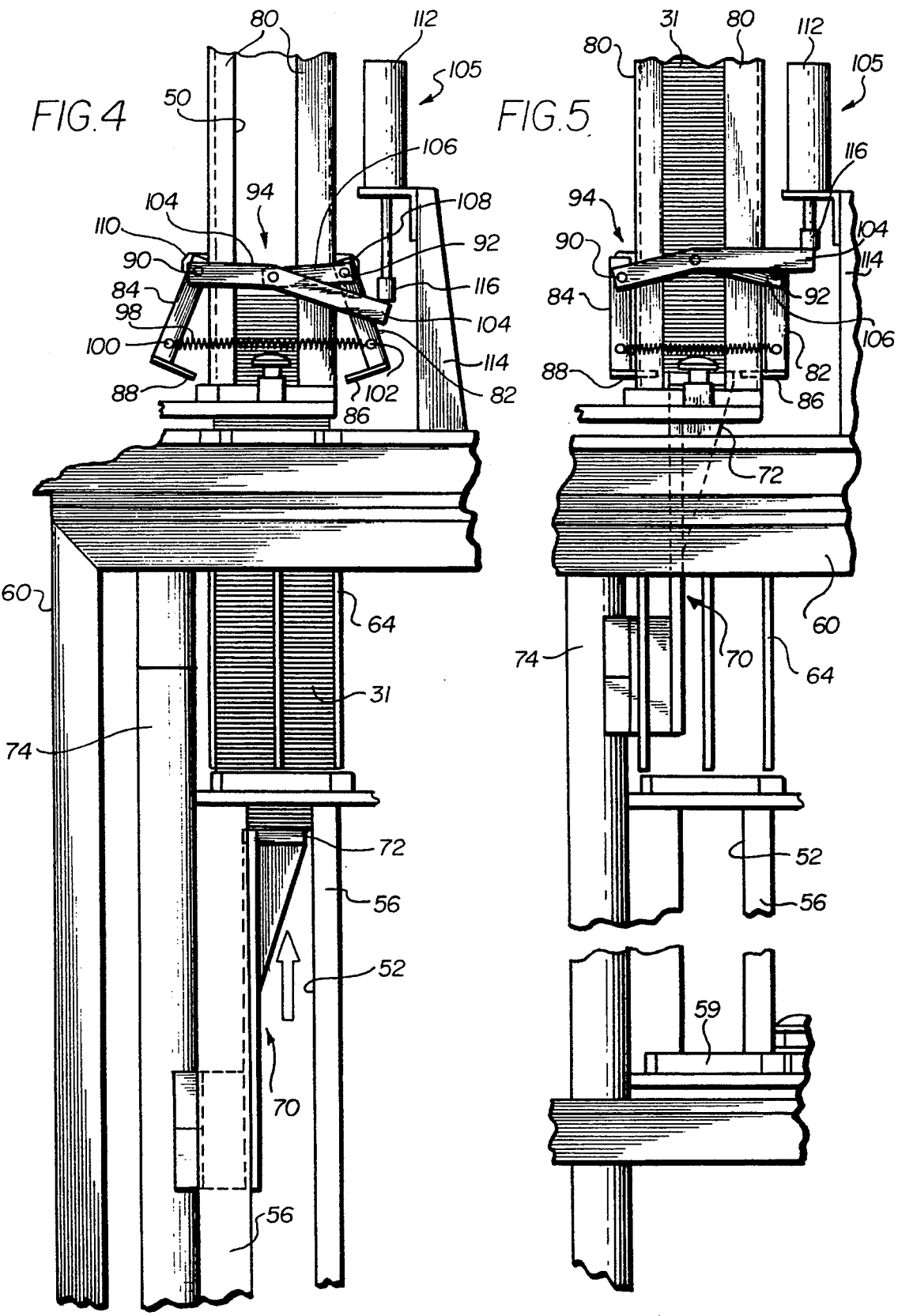

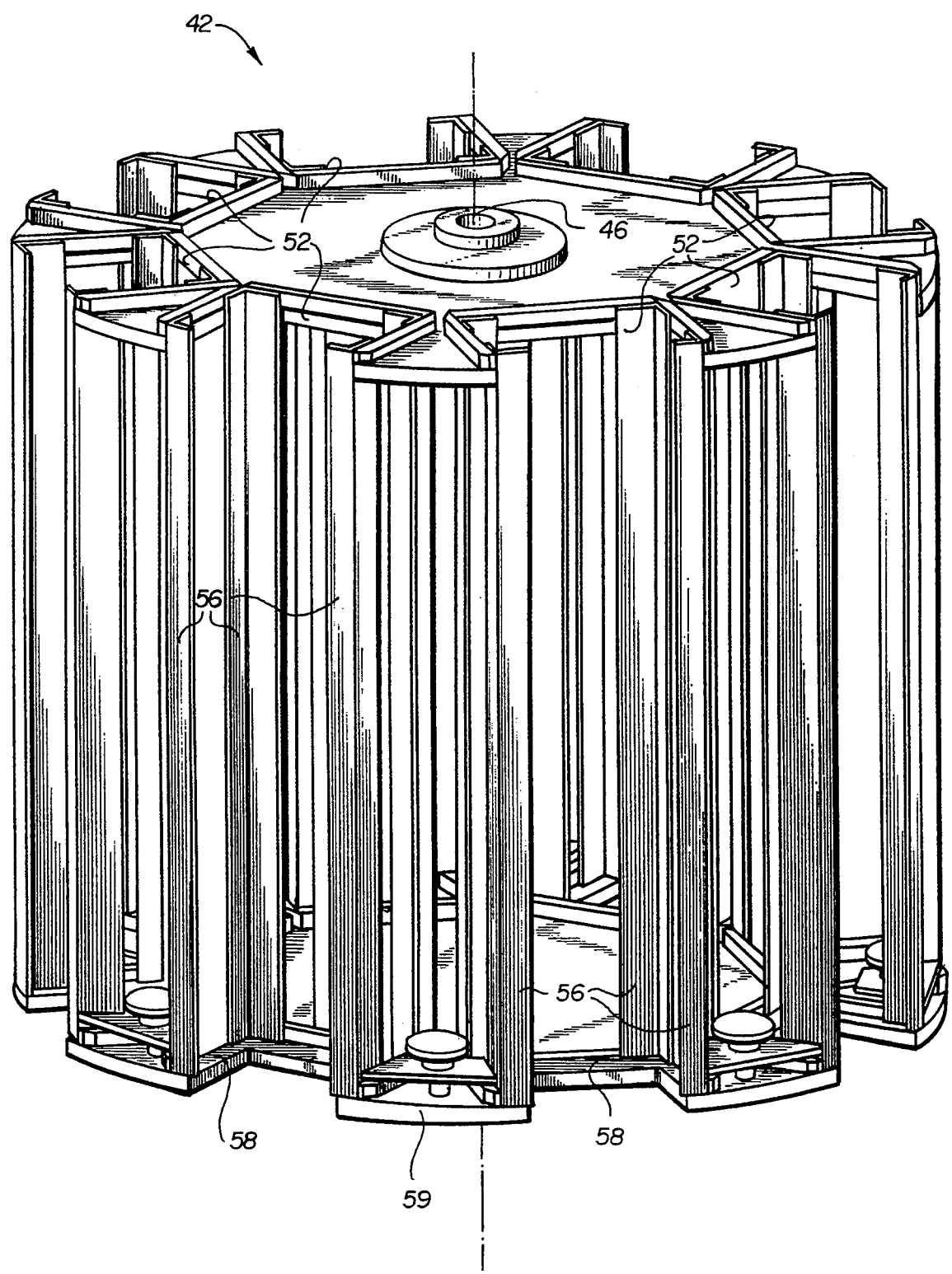

ROTARY ARTICLE STORAGE AND OUTFEED APPARATUS

BACKGROUND OF THE INVENTION

This invention relates generally to article storage and feeding apparatus for providing a supply of articles to article utilization equipment, and more particularly to a novel and improved rotary article storage and outfeed apparatus for storing a supply of articles such as collapsed or folded cartons or carton blanks and feeding the articles on demand to utilization equipment.

Modern consumer products processing and filling equipment operates at relatively high rates of speed to attain economical production costs in the filling process. In order to maintain these relatively high speeds, the filling equipment must be provided with a reliable and continuous supply of cartons or packages to be filled. Specialized equipment sometimes called feeding or infeeding equipment has been devised to meet this need.

One particularly successful type of infeed device is a so-called carousel-type feeder, such as those described and claimed for use with can ends in U.S. Pat. Nos. 3,722,741 and 4,000,709. A similar carousel-type feeder for carton blanks is also described in U.S. Pat. No. 4,592,462. All of the above-noted U.S. Patents are commonly owned herewith.

Similar requirements and problems are encountered in processing relatively flat, thin articles such as collapsed or folded cartons or carton blanks or so-called out-serts, which are generally folded printed materials such as instructions, coupons, advertising materials or the like which are packaged with products, often on the exterior of the packaging, to be held by shrink wrap or the like. Hence, the name out-serts, rather than the more familiar inserts which would be physically inserted within the package or other container. The equipment of the above-referenced patents, as well as the present invention, can also be adapted to handle a wide variety of stackable products or parts, such as metal, plastic or paperboard lids, tubs, stampings or box flats.

The use of such carousel feed units with carton blanks or out-serts require somewhat more careful handling than in the case of metal parts such as can ends. For example, it is important to avoid damage, bending or fraying of the edges of these paper or cardboard products. The handling often involves transfer from an outfeed or supply pocket or chamber of the carousel feeding apparatus to a receiving pocket or chamber or other intake device of a supply means for subsequent processing equipment.

In U.S. Pat. No. 5,096,371, which is commonly owned herewith, there is described a device for delivering stacked carton blanks or the like from an outfeed or supply pocket of a carousel feeding device to an elevated intake of a product filling lane. In this regard, the intake or infeed apparatus of the product filling line is located at a higher vertical level than the carousel feeding device.

While the use of the carousel feeding device and transfer for carton feeding apparatus of the above-mentioned '371 patent has proven highly successful in operation, some generally lower volume or lower speed applications exist which do not require the high capacity of operation and overall size of this equipment. In this regard, a typical carousel feeding apparatus of this type (i.e., as in U.S. Pat. No. 4,592,462) may employ twenty or more supply pockets to be filled with articles such as can ends or carton blanks. In some applications, this amount of accumulation and the attendant expense of a machine of this size are not necessary.

Accordingly, the present invention provides a smaller capacity and overall smaller size of carton feeding and transfer apparatus for storing a supply of articles such as carton blanks at a level easily accessible by an operator from floor level and for feeding these carton blanks upwardly to a vertical level above the supply and outfeeding the cartons from this higher level to an infeed or input for utilization equipment. With the smaller size of the present invention an operator can both operate the equipment and continue to supply the carton blanks or other articles to a storage portion of the device from a single operator station. Moreover, two or more apparatuses in accordance with the invention may be placed in relatively close proximity, such that a single operator can monitor the operation and provide an ongoing supply of articles to these two or more units. It should be recognized that the much larger overall size of the rotary feeder device as described for example in the above-referenced '741, '709 and '462 patents, is such that an operator is generally only able to operate and resupply articles to a single one of devices of this type. Thus, with the apparatus of the invention, only one operator may in fact be required to supply several packaging lines with carton blanks, out-serts or similar articles.

OBJECTS AND SUMMARY OF THE INVENTION

Accordingly, it is a general object of this invention to provide a novel and improved rotary article storage and outfeed apparatus.

Briefly, and in accordance with the foregoing object, a rotary article storage and outfeed apparatus for storing a plurality of groups of generally flat articles in a facewise stacked condition and for delivering a supply of said articles to an infeed for a device wherein said articles are to be utilized, said apparatus comprising: an upper rotary carousel rotatable about an upper axis and a lower rotary carousel located below said upper carousel and rotatable about a lower axis parallel to and offset from said upper axis; each of said carousels having a plurality of circumferentially spaced vertically oriented pockets, each pocket being dimensioned for receiving a group of articles in a facewise stacked condition; a frame mounting said upper and lower carousels so that an upper end of the pockets of the lower carousel is spaced below a lower end of the pockets of said upper carousel, and so that said lower and upper axes are offset in such a way that one of the pockets of said lower carousel coaxially aligns with one of the pockets of said upper carousel at one position in the respective rotations thereof to define an article transfer position; and article transfer means for transferring a group of articles between the pockets of the respective carousels which are aligned and located in said transfer position.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description, taken in connection with the accompanying drawings in which like reference numerals identify like elements, and in which:

FIG. 1 is a perspective view of apparatus in accordance with the invention;

FIG. 2 is a diagrammatic top plan or overhead view illustrating the apparatus of the invention in use in an exemplary product filling line;

FIG. 4 is an enlarged partial view similar to FIG. 3 illustrating further details and moved positions of several of the parts thereof;

FIG. 5 is an enlarged partial view similar to FIG. 3 illustrating further details and moved positions of several of the parts thereof;

FIG. 7 is an enlarged perspective view of a lower carousel portion of the apparatus of the invention; and FIG. 8 is a diagrammatic side elevation illustrating an optional additional loading pocket for use with the apparatus of the invention.

DETAILED DESCRIPTION OF THE ILLUSTRATED EMBODIMENT

Figure 3:
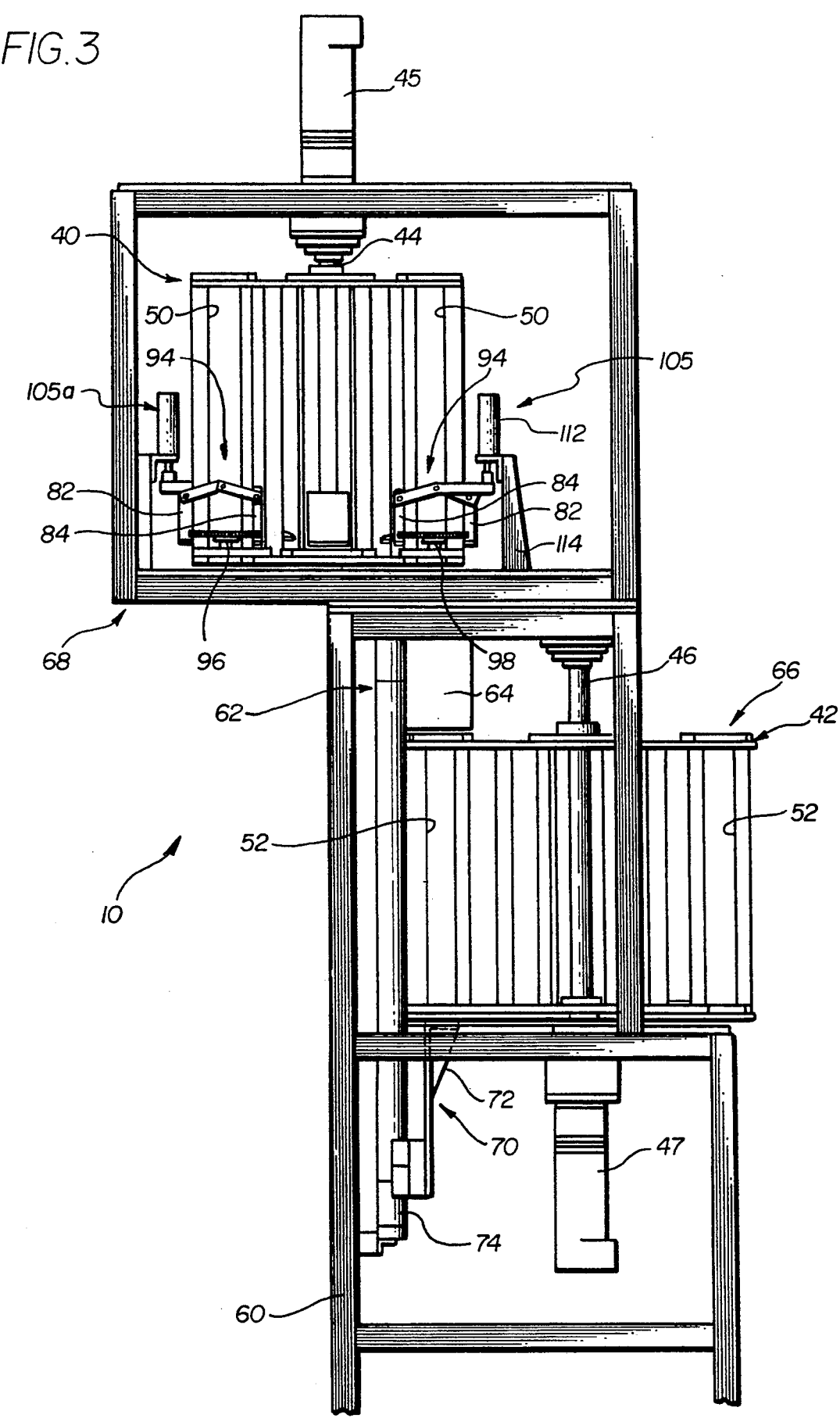
FIG. 3 is an enlarged side elevation illustrating further details of the apparatus of the invention.

Referring now to the drawings, and initially to FIG. 1, a rotary article storage and outfeed apparatus in accordance with the invention as designated generally by the reference numeral 10. Referring briefly to FIG. 2, the apparatus 10 is illustrated in connection with a product filling line in which a product is to be packaged, for example in a folding paper or cardboard carton. The apparatus 10 provides a supply of such packages, or of out-serts or other generally flat, folded items to be included in the packages, to the filling line 12. Product to be filled is supplied from a product machine 14 through a conveyor or conduit 16 to an automatic product transfer station or apparatus 18. The transfer station or apparatus 18 in turn feeds product through a further conveyor 20 to a continuous motion horizontal cartoner apparatus 22. The product is placed in individual containers at the cartoner 22. The storage and outfeed apparatus of the invention feeds the containers or carton blanks to the cartoner by way of a conduit 24. Finally, packaged product is fed out to a case packer 26 from the cartoner 22 by way of a conduit or conveyor 28.

As best viewed in FIG. 1 the infeed conduit 24 from the article storage and outfeed apparatus 10 to the cartoner 22 is located at a vertically elevated position relative to the floor. However, it is desirable for an operator 30 to provide a supply of folded cartons or carton blanks to the apparatus 10 while standing at floor level, preferable through an infeed chute 32 located at a convenient vertical height for the operator 30 to introduce cartons to the storage and outfeed apparatus 10.

In order to elevate stacks 31 of cartons so that their lower ends are at the level of an outfeed 34 which feeds the conduit or conveyor 24, while at the same time providing some accumulation, supply or backlog of cartons to ensure a continuous flow or supply at output 34, the apparatus 10 of the invention includes a pair of rotary carousels 40, 42. Referring also to FIG. 3, the upper rotary carousel 40 rotates about a generally vertically oriented upper axis or shaft 44, while the lower carousel 42 rotates about a generally vertically oriented lower axis or shaft 46 which is parallel to and offset from the upper axis 44. Suitable motors 45, 47 are provided for rotating the carousels 40, 42 for loading, unloading and trasnfer of articles as described herein, under the control of a control means 49.

Figure 6:
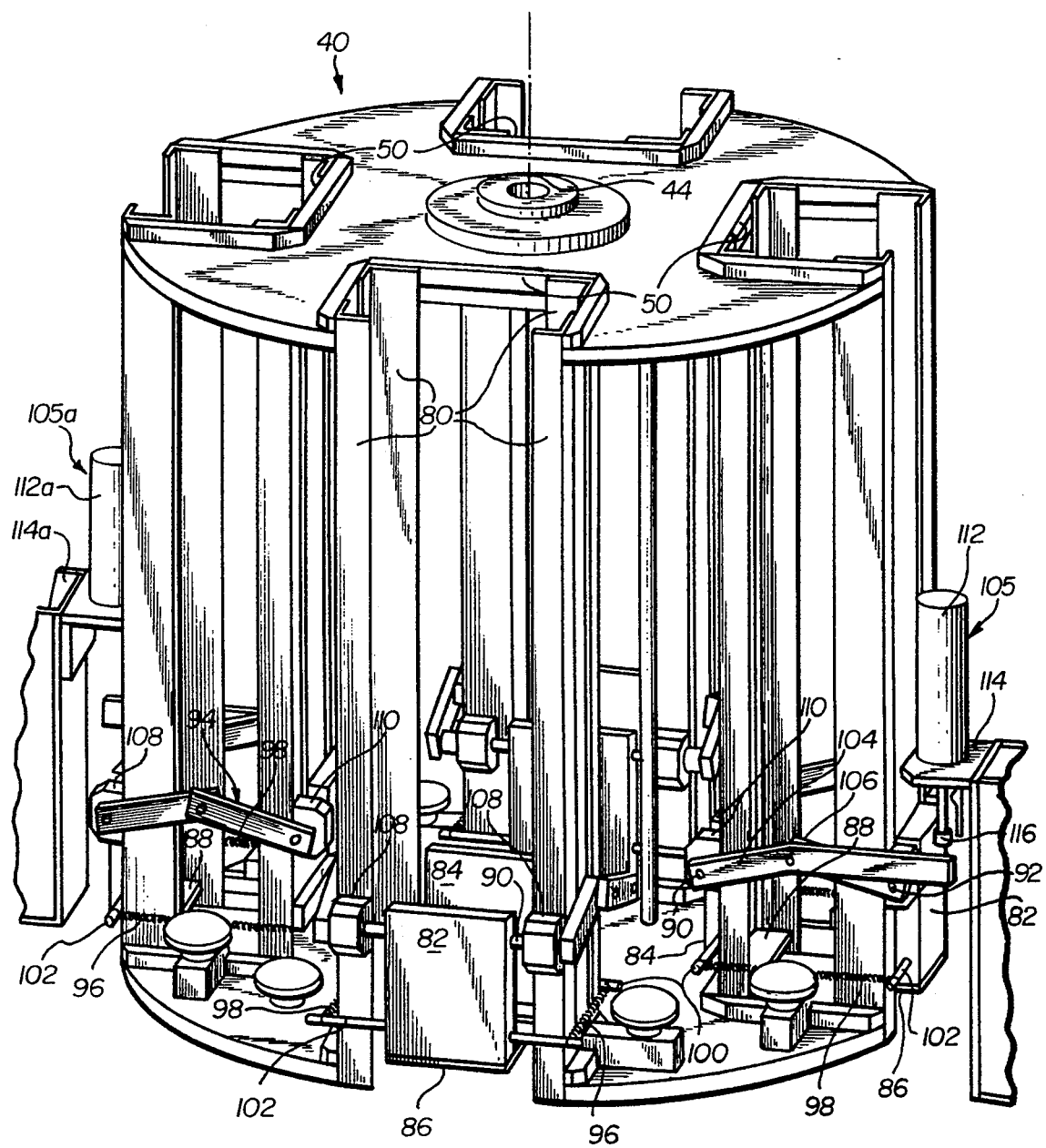
FIG. 6 is an enlarged perspective view of an upper carousel portion of the apparatus of the invention.

As best viewed in FIGS. 6 and 7, each of upper carousel 40 and the lower carousel 42 includes a plurality of circumferentially spaced vertically oriented pockets 50, 52, respectively. Each of the pockets 50, 52 is dimensioned for receiving a group of articles such as carton blanks in a facewise stacked condition therewithin. In the illustrated embodiment, the article receiving pockets 50 are equally angularly oriented and are four in number, whereby each is offset from the next by a substantially 90° about the axis 44. The pockets 52 of the lower carousel 42 are eight in number in the illustrated embodiment and each is angularly spaced from the next by substantially 45° about the axis 46.

Referring again to FIG. 1, and also to FIG. 3, a box-like frame structure 60 mounts the upper and lower carousels 40, 42 for rotation about their respective axes or shafts 44, 46 with the upper and lower axes or shafts 44 and 46 parallel and spaced apart, and also such that the upper end of the pockets 52 of the lower carousel 42 is spaced somewhat below a lower end of the pockets 50 of the upper carousel 40. Moreover, this mounting on the frame 60 is such that the upper carousel and lower carousel and the respective axes 44, 46 are offset by an amount such that there is a defined a transfer position 62 at which one of the pockets 52 of the lower carousel 42 is coaxially aligned with one of the pockets 50 of the upper carousel 40 to permit the transfer of a group of articles between the respective aligned pockets.

In accordance with a further aspect of the invention an article transfer means or apparatus 70 is provided for effecting the transfer of a group 31 of articles between the respective aligned pockets 50, 52 of the upper and lower carousels 40, 42 which are aligned and located at the transfer position 62. Preferably, a further set of guide rails or conduit 64 is provided in the transfer position for guiding the cartons through the space between the upper end of the pocket 52 of lower carousel 42 and a lower end of the pocket 50 of the upper carousel 40 which is aligned therewith in the transfer station 62. It will be noted in this regard that the infeed chute 32 is located for alignment with an upper end of a pocket 52 of the lower carousel 42 at an infeed position 66 which is angularly offset from the transfer position 62, and preferably by substantially 180° relative to the carousel 42. Similarly, the outfeed chute 34 is located for alignment with a lower end of a pocket 50 the upper carousel 40 at an outfeed position 68 which is angularly offset, preferably by 180°, relative to the carousel 40, from the transfer position 62.

While the invention is equally applicable to a situation in which articles are to be downloaded, that is transferred to a lower level from an upper level, in the illustrated embodiment, the transfer of cartons, as indicated hereinabove, takes place by lifting cartons from the lower carousel 42 into the upper carousel 40. However, the reverse transfer arrangement, namely from the upper carousel 40 to the lower carousel 42 could be accommodated without departing from the principles of the invention.

In this latter regard, the transfer means 70 comprises a lifting means or assembly including a lift arm 72 which is located and configured for projecting into an open frontal area of a pocket 50, and an elongated drive member 74 which may be a fluid operated cylinder, a ball screw, or a similar elongated drive component to which the lift arm 72 is attached by means of suitable brackets 76. Thus, the lift arm 72 is capable of movement from a completely retracted position indicated in FIG. 3 through an intermediate position illustrated in FIG. 4 to an upper position illustrated in FIG. 5 wherein the stack of cartons is fully transferred from the pocket 52 of the lower carousel 42 to the pocket 40 of the upper carousel 50 which is aligned therewith at the transfer position 62.

As best viewed in FIG. 7, each of the pockets 52 of the lower carousel 42 is dimensioned and configured for receiving and maintaining a stack of articles such as generally rectangular carton blanks in facewise stacked condition. At the same time, the pockets 52 are configured to permit entry of the lift arm 72 to effect the transfer operation. In this regard, each of pockets 52 is defined by four elongated generally right angle extrusion or channel members 56 which are located to embrace the four corners of the cartons to be stacked in the pocket 52. A generally U-shaped bottom support member or shelf 58 is defined by a bottom support plate or member 59 which forms a bottom portion of the carousel 42. Thus, the lift arm 72 is configured for entering each pocket 52 through the opening provided by this generally U-shaped bottom support shelf 58. Operation of the transfer mens 70 in cooperation with rotation of the carousels 40,42 is accomplished by the control means 49 automatically.

As best viewed in FIG. 6, the upper carousel 40 will be seen to similarly have each of its pockets 50 defined by four elongate right angle extrusions or channels 80 forming four corners thereof located and dimensioned for receiving and embracing the four corners of a stack of articles such as rectangular box blanks therewithin. A bottom closure or support wall for articles to be held in each of the pockets 50 is formed by hingedly movable door means which in the illustrated embodiment comprise a pair of complementary door members 82, 84.

In the illustrated embodiment the door members 82 and 84 are generally L-shaped members having bottom edge portions 86, 88 which project partially into and provide the bottom closure and supports for the articles in the pockets 50. The upper ends of these door members 82, 84 are fixedly mounted to respective pivot shafts 90, 92 so as to be movable between a closed position for supporting a stack of articles in the pocket and an open position for either receiving articles into the pocket or releasing articles from the pocket. A door-operating linkage assembly 94 is provided for operating the door means 82, 84 between these open and closed positions.

In the illustrated embodiment, a pair of tension springs 96, 98 are coupled with the respective door means 82, 84, preferably at projecting pins 100, 102 which project oppositely outwardly from the edges of the door members 82, 84 at a location spaced downwardly from the pivot shafts 90, 92. Hence, the springs releasably hold the doors in the closed position. The closed position is further defined by engagement of the shafts or pins 100, 102 which mount the springs with outer edges of the respective channels 80 which define the pocket 50.

The linkage assembly 94 includes a first linkage arm 104 which has one end non-rotatably affixed to an end of pivot shaft 90 of door 82. An opposite end of the linkage arm 104 projects oppositely outwardly for engagement by an actuator means 105 which will be described hereinbelow. A second linkage arm 106 which has one end pivotally coupled to a mid-portion of linkage arm 104 and an opposite end non-rotatably affixed to an end portion of the pivot shaft 92 of the door 84. Respective pivot shafts 90 and 92 are rotatably mounted in bearing blocks 108, 110 which are affixed to respective ones of the angle extrusions 80.

Referring now to the actuator means or assembly 105, it will be seen that two such actuator assemblies 105, 105a are provided, one located adjacent the transfer position 62 and the other located adjacent the outfeed position 68. It will be noted that these are the only two positions at which operation of the doors 82, 84 to their open position will be required, in the first instance for receiving cartons into the pocket 50 and in the latter case for releasing cartons from the pocket 50 to the outfeed chute 34. Each of the actuator assemblies 105, 105a include a piston-and-cylinder 112 and bracket 114 which fixedly mounts the piston and cylinder 112 for alignment with the projecting end of a linkage arm 104 as its associated pocket 50 becomes aligned with the transfer position 62 and outfeed position 68, respectively. Each piston and cylinder has a projecting piston arm 116 which directly engages the projecting end of a linkage arm 104 in this regard.

Referring now briefly to FIG. 8, an alternative means for loading groups or stacks of cartons into the pockets 52 of the lower carousel 42 at the infeed position 66 is illustrated. This pocket loader means or assembly 120 comprises a generally U-shaped elongate channel which is of similar cross-sectional configuration and height to the pockets 52. A pivot or hinge means 122 hingedly mounts the channel 120 adjacent the lower carousel 42 at the infeed position 66. The hinged or pivotal mounting at 122 is such that as to permit movement of the pocket loader 120 between a substantially horizontal position and a substantially vertical position is indicated in phantom line in FIG. 8. When in the second or vertical orientation, the channel 120 is in alignment with one of the pockets 52 of the lower carousel 42.

A horizontal transfer means which may take the form of an elongate generally vertically oriented member 124 is located generally at the back of the channel 120, and is movable, for example by means of a perpendicularly outwardly projecting handle 126 which projects through a rear end of channel 120. The pusher or transfer bar or member 124 is thus generally horizontally movable for pushing the stack of articles in a generally horizontal manner as indicated by arrow 128 out of the loader channel 120 and into a facing pocket 52 or carousel 42 at the infeed or loading position 66. In this regard, some modification, including the possible provision of elongate hinged doors or panels at the front edges or surfaces of front angle extrusions or channels 56 of each of the pockets 52 might be effected. One example of generally hinged doors and actuator means for operating such hinged doors between an open and closed position for a pocket of a similar type is illustrated and described for example in the above-mentioned prior U.S. Pat. No. 5,096,371, which is incorporated by reference in this regard.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A rotary article storage and outfeed apparatus for storing a plurality of groups of generally flat articles in a facewise stacked condition and for delivering a supply of said articles to an infeed for a device wherein said articles are to be utilized, said apparatus comprising: an upper rotary carousel rotatable about an upper axis and a lower rotary carousel located below said upper carousel and rotatable about a lower axis parallel to and offset from said upper axis; each of said carousels having a plurality of circumferentially spaced vertically oriented pockets, each pocket being dimensioned for receiving a group of articles in a facewise stacked condition; frame means mounting said upper and lower carousels so that an upper end of the pockets of the lower carousel is spaced below a lower end of the pockets of said upper carousel, and so that said lower and upper axes are offset in such a way that one of the pockets of said lower carousel coaxially aligns with one of the pockets of said upper carousel at one position in the respective rotations thereof to define an article transfer position; and article transfer means for transferring a group of articles between the pockets of the respective carousels which are aligned and located in said transfer position.

2. Apparatus according to claim 1 and further including an outfeed chute located at an outfeed position angularly offset from said transfer position, for alignment with a lower end of a pocket of one of said carousels, which pocket has been rotated to said outfeed position.

3. Apparatus according to claim 1 and further including an infeed chute located at an infeed position angularly offset from said transfer position, for alignment with an upper end of a pocket of one said carousels, which pocket has been rotated to said infeed position.

4. Apparatus according to claim 1 wherein said article transfer means comprises lifting means located adjacent said transfer position for lifting a group of articles from a pocket of the lower carousel into a pocket of said upper carousel aligned therewith at said transfer position.

5. Apparatus according to claim 1 wherein each of said pockets of said upper carousel includes hingedly movable door means defining a bottom closure therefor and movable between a closed position for supporting a stack of articles in said pocket and an open position for receiving said articles into said pocket and releasing articles from said pocket respectively, and door linkage means for operating said door means between said open and closed positions.

6. Apparatus according to claim 5 and further including spring means operatively coupled with said door means for releasably holding said door means in said closed position.

7. Apparatus according to claim 5 and further including actuator means mounted adjacent said transfer position and an outfeed position angularly offset from said transfer position respectively and located for operative engagement with said door linkage means for operating said door means of pockets located in said transfer position and in said outfeed position, respectively.

8. Apparatus according to claim 1 and further including pocket loader means comprising an elongate channel defining an axis and being of similar cross-sectional configuration and height to said pockets for receiving a stack of articles therein; means hingedly mounting said elongate channel adjacent said lower carousel at an infeed position angularly offset from said transfer position for movement between a substantially horizontal orientation and a substantially vertical orientation wherein said channel is in alignment with one of said pockets of said lower carousel, and horizontal transfer means for transferring a stack of articles from said channel to said pocket of said lower carousel in alignment therewith.

9. Article storage and outfeed apparatus for a plurality of groups of generally flat articles in face-wise stacked conditioned and for delivering a supply of said articles from said apparatus to an infeed for a device wherein said articles are to be utilized, said apparatus comprising an upper group of vertically oriented, spaced pockets movable along a fixed closed path; a lower group of vertically oriented spaced pockets movable about a fixed closed path; each of said pockets of said upper and lower group being dimensioned for receiving a stack of said articles in face wise stacked condition; said upper and lower groups of pockets being offset in such a way that the paths of movement of said upper and lower group of pockets overlap at at least one location to define a transfer position, such that one of said pockets of said lower group will be aligned coaxially with one of the pockets of said upper group at said transfer position, with the upper ends of the pockets of said lower group being spaced below the lower ends of the pocket of said upper group at said transfer position; and article transfer means associated with said transfer position for transferring a group of articles from said lower one of said coaxially aligned pockets to the said upper one of said coaxially aligned pockets.

10. Apparatus according to claim 9, wherein said upper group of vertically oriented pockets are mounted to a rotary carousel means.

11. Apparatus according to claim 10, wherein said lower of group of relatively oriented pockets is mounted to a second rotary carousel means.

12. Apparatus according to claim 9, further including an outfeed chute located at an outfeed position angularly offset from said transfer position for receiving a stack of said articles from said upper vertically oriented pockets for delivery to an infeed device utilizing said article.

13. Apparatus according to claim 12, wherein said outfeed chute is located below the lower ends of said upper group of pockets.

14. Apparatus according to claim 9, wherein each of said pockets of said upper group includes movable door means defining a bottom closure therefor and movable between a closed position for supporting a stack of articles in said pocket and an open position for receiving said articles into said pocket and releasing articles from said pocket when necessary.

15. Apparatus according to claim 14, wherein said movable door means are hingedly connected and include linkage means for operating said door means between said open and closed positions, with spring means operatively coupled with said door means for releasably holding said door means in said closed position.

16. Apparatus according to claim 15, further including actuator means mounted adjacent said transfer position and said outfeed position angularly offset from said transfer position respectively and located for operative engagement with said door linkage means for operating said door means of said pockets to the open position when said pockets are located at said transfer position or said outfeed position, respectively.

* * * * *